United States Patent
McPherson

(10) Patent No.: US 10,034,474 B2
(45) Date of Patent: Jul. 31, 2018

(54) ADJUSTABLE ANIMAL DECOY WITH SIMULATED FEATHER/FUR EXTERIOR

(71) Applicant: Flint Holdings, LLC, Hummelstown, PA (US)

(72) Inventor: Jerry McPherson, Colstrip, MT (US)

(73) Assignee: FLINT HOLDINGS, LLC, Hummelstown, PA (US)

(*) Notice: Subject to any disclaimer, the term of this patent is extended or adjusted under 35 U.S.C. 154(b) by 103 days.

(21) Appl. No.: 14/954,608

(22) Filed: Nov. 30, 2015

(65) Prior Publication Data
US 2017/0150711 A1    Jun. 1, 2017

(51) Int. Cl.
A01M 31/06    (2006.01)

(52) U.S. Cl.
CPC .................. *A01M 31/06* (2013.01)

(58) Field of Classification Search
CPC ..................................... A01M 31/06
USPC ........................................ 43/2, 3
See application file for complete search history.

(56) References Cited

U.S. PATENT DOCUMENTS

| | | | | |
|---|---|---|---|---|
| 4,965,953 A * | 10/1990 | McKinney | ............ | A01M 31/06 43/2 |
| 5,191,730 A * | 3/1993 | Balmer | ................. | A01M 31/06 43/2 |
| 5,515,637 A * | 5/1996 | Johnson | ................ | A01M 31/06 43/2 |
| 5,943,807 A | 8/1999 | McPherson | | |
| 6,216,382 B1 * | 4/2001 | Lindaman | ............ | A01M 31/06 248/156 |
| 7,272,906 B1 * | 9/2007 | Spaulding, Sr. | ...... | A01M 31/06 248/156 |
| 7,788,839 B2 | 9/2010 | McPherson | | |
| 7,827,728 B1 * | 11/2010 | Spafford | ............... | A01M 31/06 273/403 |
| 2006/0053675 A1 * | 3/2006 | Lindaman | ............ | A01M 31/06 43/2 |
| 2006/0123688 A1 * | 6/2006 | Box | ...................... | A01M 31/06 43/3 |
| 2006/0143969 A1 * | 7/2006 | Lindaman | ............ | A01M 31/06 43/2 |
| 2007/0289193 A1 * | 12/2007 | Alexander | ............ | A01M 31/06 43/3 |
| 2009/0007479 A1 * | 1/2009 | Jerome, Sr. | ........... | A01M 31/06 43/2 |
| 2009/0249678 A1 * | 10/2009 | Arnold | .................. | A01M 31/06 43/2 |

(Continued)

*Primary Examiner* — Darren W Ark
*Assistant Examiner* — Brady W Frazier
(74) *Attorney, Agent, or Firm* — Quarles & Brady LLP

(57) ABSTRACT

An animal decoy comprising a coil spring, where the coil spring is shaped to resemble at least a portion of a body of an animal, and an exterior fabric layer over at least a portion of the coil spring. The exterior fabric layer displaying a realistic representation of an animal, including a representation of a first type of detail with a first edge, and a representation of a second type of detail with a second edge, wherein the exterior fabric layer is cut along at least a portion of the first edge and at least a portion of the second edge. The animal decoy has a plurality of leg pole sleeves, each leg pole sleeve includes a first top section attached at a point within an internal cavity of the animal decoy, and each have an opening connected to the exterior fabric layer.

11 Claims, 9 Drawing Sheets

(56) References Cited

U.S. PATENT DOCUMENTS

| | | | | |
|---|---|---|---|---|
| 2009/0307958 A1* | 12/2009 | McPherson | ............ | A01M 31/06 43/3 |
| 2010/0064569 A1* | 3/2010 | Wyant | ................... | A01M 31/06 43/2 |
| 2010/0154283 A1* | 6/2010 | Fischer | ................ | A01M 31/06 43/3 |
| 2010/0180486 A1* | 7/2010 | Jaeger | ....................... | A45F 3/44 43/3 |
| 2011/0283591 A1* | 11/2011 | Sloop | ................... | A01M 31/06 43/3 |
| 2012/0198753 A1* | 8/2012 | Idstrom | ................ | A01M 31/06 43/3 |
| 2012/0240447 A1* | 9/2012 | Gurner, III | ............ | A01M 31/06 43/2 |

\* cited by examiner

ADJUSTABLE ANIMAL DECOY WITH SIMULATED FEATHER/FUR EXTERIOR

BACKGROUND

When hunting, decoys to attract animals may be used. There are many different types of decoys, for example, full-bodied replicas of deer, elk, and other big game are available on the market. Additionally, there are two-dimensional expandable decoys that show a photographic or realistic representation of an animal. When hunting game birds, such as ducks, geese, and turkeys, decoys which resemble the two or three-dimensional shape and coloration of the desired game bird may be utilized. To achieve a decoy with generally three-dimensional shape, solid or compressible decoys may be used. The solid decoys may have a molded outer surface created to mimic the real appearance of the animal being decoyed. Alternatively, the collapsible decoys may have an outer surface of the decoy with a printed picture showing a real depiction of an animal in order to mimic the appearance of the animal being decoyed.

While solid decoys may include a space for attaching real or replicated feathers, for example the fan of a turkey, solid decoys do not have full body feathers that realistically move in the breeze. Collapsible decoys, whether they are two or three-dimensional, need to be pliable and foldable and would thus prohibit the use of feathers. Therefore, a way of providing life like feather movement on the exterior of a solid decoy and/or on the exterior of collapsible decoy is desirable. It is also desirable to create a similar effect for other types of animal decoys for animals that have fur instead of feathers.

Animal decoys may be positioned in the ground through the use of a mounting post. The mounting post would typically be a stake which may include a perpendicular side piece that allows the user to press with his foot or hand in order to push the mounting post into the ground. The decoy may then be attached to the top of the mounting post. Present decoys only include a single mounting position which does not allow a user to position the decoy in various poses while using the mounting post. It would be desirable to have a two-dimensional or three-dimensional decoy that could be positioned in various different poses when using the mounting post in order to mimic different positions showing animal behaviors, such as feeding or looking.

BRIEF DESCRIPTION OF THE DRAWINGS

The detailed description is set forth with reference to the accompanying figures. The use of the same reference numbers in different figures indicates similar or identical items or features.

DETAILED DESCRIPTION

In various embodiments described herein, different types of animal decoys are described. In some embodiments, the decoy may be a bird decoy. For example, the bird decoy may have an exterior that realistically represents a specific type of bird. The realistic representation of the type of bird may be attained in a number of different ways. For example, the bird decoy may have a solid exterior that is molded and colored to resemble a type of bird. As another example, the bird decoy may have a soft fabric exterior and the soft fabric exterior may be imprinted with a realistic representation of a type of bird. Such a decoy could be either a two or three-dimensional representation of a type of bird.

Figure 1:
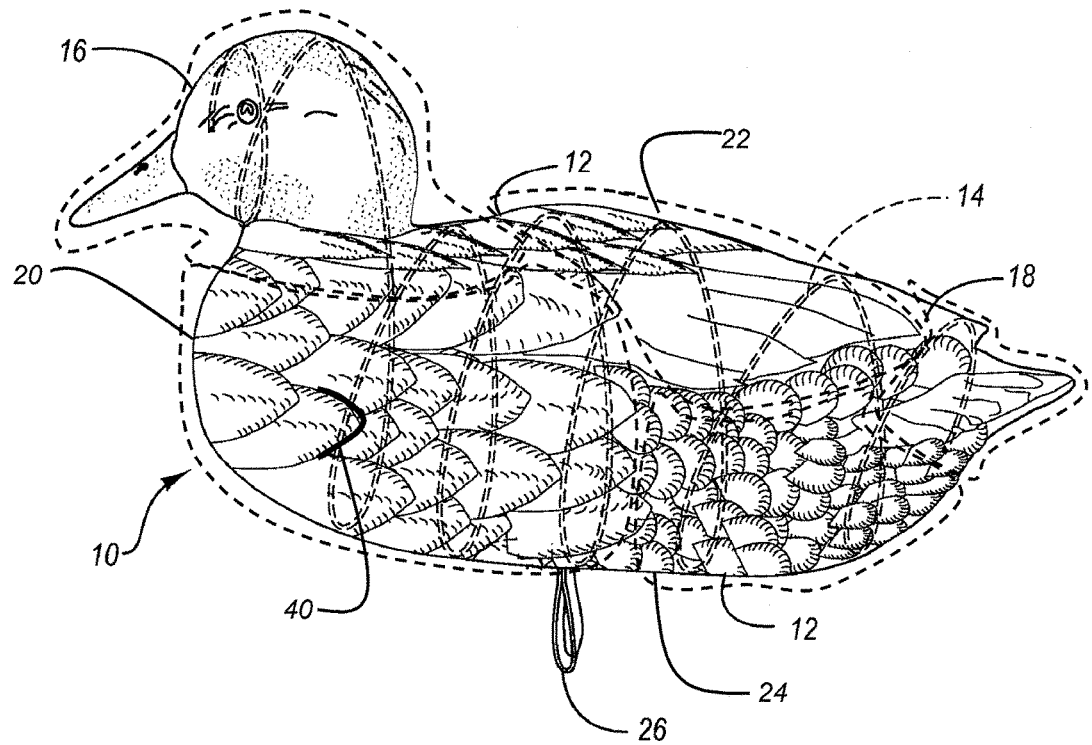
FIG. 1 illustrates a side view of an animal decoy with delineated regions, according to an embodiment.

FIG. 1 is a side view of a bird decoy 10. According to an embodiment, bird decoy 10 is a collapsible decoy with a bird body 12 that is made from a two-dimensional fabric material that covers a coil spring 14. The coil spring 14 is shaped so that the bird body 12 resembles the general shape of the bird which it is intended to imitate. The two-dimensional fabric material of bird body 12 may be imprinted with an actual photograph, which shows a depiction of a specific bird. For example, the two dimensional fabric material of bird decoy 10 shows a duck. The printed two dimensional fabric material of bird decoy 10 shows the correct feather features of a typical duck. Specifically, the feather features vary according their location on the bird decoy 10. For example, the bird decoy 10 may have different regions, such as a head region 16, a tail region 18, a chest region 20, a wing region 22, and a lower body region 24. In FIG. 1 these regions are delineated with dashed lines.

These different regions depict a realistic representation of the feathers for that region of a typical duck. To increase the realism of the printed pattern, specific cuts in the two-dimensional fabric material can be made to allow the realistic representation of the feathers to behave similarly to feathers on a real bird by fluttering and reacting to a breeze. For example, in the chest region 20, cuts in the fabric may be made on the back edge of the feathers. The back edge of the feather refers to the side of the feather that faces towards the tail region 18. Similarly, the top, bottom, or front edge of a feather would be in relation to the orientation of the bird decoy 10, where top edge would be the side of the feather image that is closest to the top of the bird decoy 10, the bottom edge of a feather would be the side of the feather image that is closest to the bottom of the bird decoy 10, and front edge of a feather would be the side of the feather image that is closest to the head region 16 of the bird decoy 10. In the two-dimensional representation of the feather on the two-dimensional fabric, the side or edge of a feather is determined by the image. The trailing edge of the feather is the edge of the feather that is exposed, or that appears exposed in the realistic representation, and the feather may be positioned such that the trailing edge of the feather can be any of the top, bottom, front, or back edges, as described above.

The cuts, may for example, follow the edge of the feather as shown in the printed picture. Feather cut 40 shows a representative cut that may be made on the back edge of one of the chest feathers. Any number of feather cuts can be made, with a cut for each feather shown, or alternatively, strategically placing the feather cuts to maximize their effect without comprising the stability of the two dimensional fabric.

Each region may have different types of cuts to mimic the types and shapes of feathers present in those regions. Generally, the two types of feathers that are visible on a bird are flight feathers and contour feathers. Flight feathers are found on the wings and the tail, and the contour feathers are found everywhere except the beak, legs, and feet of the bird. The shapes of both the flight and the contour feathers vary greatly depending on the species of bird. In FIG. 1, the regions on the bird decoy 10 are shown in dashed lines and correspond to the main areas where similar feathers are found. The cuts to the different types and shapes of feathers may vary depending on the species of bird, but generally, for example, in the wing region 22 the feather cuts may be made on the bottom edge of the feather and may extend lengthwise along the bird body 12. In the tail region 18 and the lower body region 24 the feather cuts may be made on the back edge or the top edge of the feathers, depending on the orientation of the feather. The feather cuts in the body region 24 may also be smaller and more numerous given the nature of the feathers in these regions.

Figure 2:
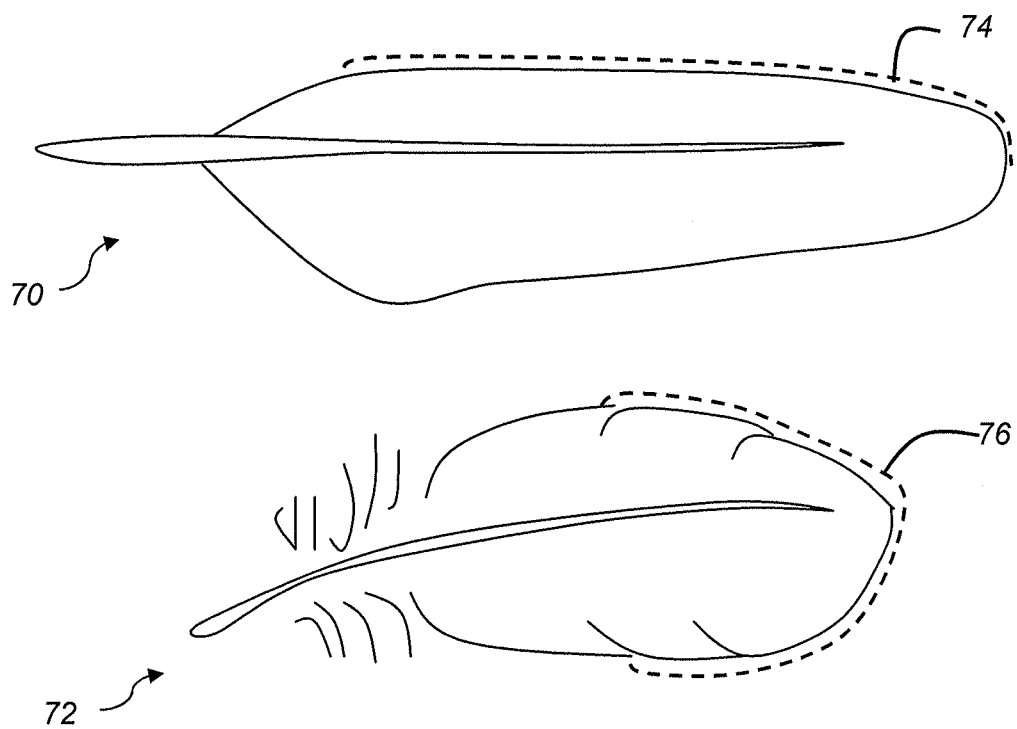
FIG. 2 illustrates a top view of flight and contour feathers and the cuts associated with each type of feather, according to an embodiment.

FIG. 2 shows a top view of a typical flight feather 70 and a typical contour feather 72. The corresponding cuts for each type of feather that may be made in the two-dimensional fabric are shown in dashed lines. For example, a typical feather cut for a flight feather 70 is shown by dashed line 74. Due to the nature of the flight feather, long, lengthwise cuts generally provide the desired realism by causing the cut two-dimensional fabric in the appropriate regions to behave as a typical flight feather would in response to a breeze. These lengthwise cuts may not necessarily be one continuous cut, but rather, may be a series of unconnected cuts that also provide the desired effect. A typical feather cut for a contour feather 72 is shown by dashed line 76. C or U-shaped cuts along the trailing edge of the contour feather would be typical for contour feathers as this type of cut, again, provides the desired realism by causing the cut two-dimensional fabric in the appropriate regions to behave as a typical contour feather would in response to a breeze. These fabric cut feathers may also fan out on their own and cause the decoy to look generally more realistic by adding depth to their appearance.

The bird body 12 may also include a second layer of two dimensional fabric imprinted with the same photograph as the first layer of two dimensional fabric. Unlike the first layer of two dimensional fabric, the second layer does not include the afore-described feather cuts. The purpose of the second layer of fabric is to provide a view of additional feathers when the feather cuts located on the first fabric layer move and open up.

In one embodiment, the two dimensional fabric is not permanently affixed to a particular decoy, rather the fabric layer with the printed picture and described feather cuts may be fashioned into a sleeve or pouch that can be fitted over an existing solid decoy. In this embodiment, the sleeve may be printed with the same pattern and colors as the corresponding solid decoy.

While the above embodiment has been described with a duck as the type of animal decoy, it should be noted that the described fabric cut technology can also apply to any other two or three-dimensional animal decoy. In the case of an animal decoy representing an animal that does not have feathers, the fabric cuts may be made to details on the realistic representation of the animal to make the two-dimensional fabric behave as the exterior of a decoyed animal would respond to a breeze or wind. For example, the fabric cuts could be made such that the realistic representation of fur would behave in response to a breeze or wind. Additionally, the fabric cuts may act to make the decoy look generally more realistic.

Figure 3:
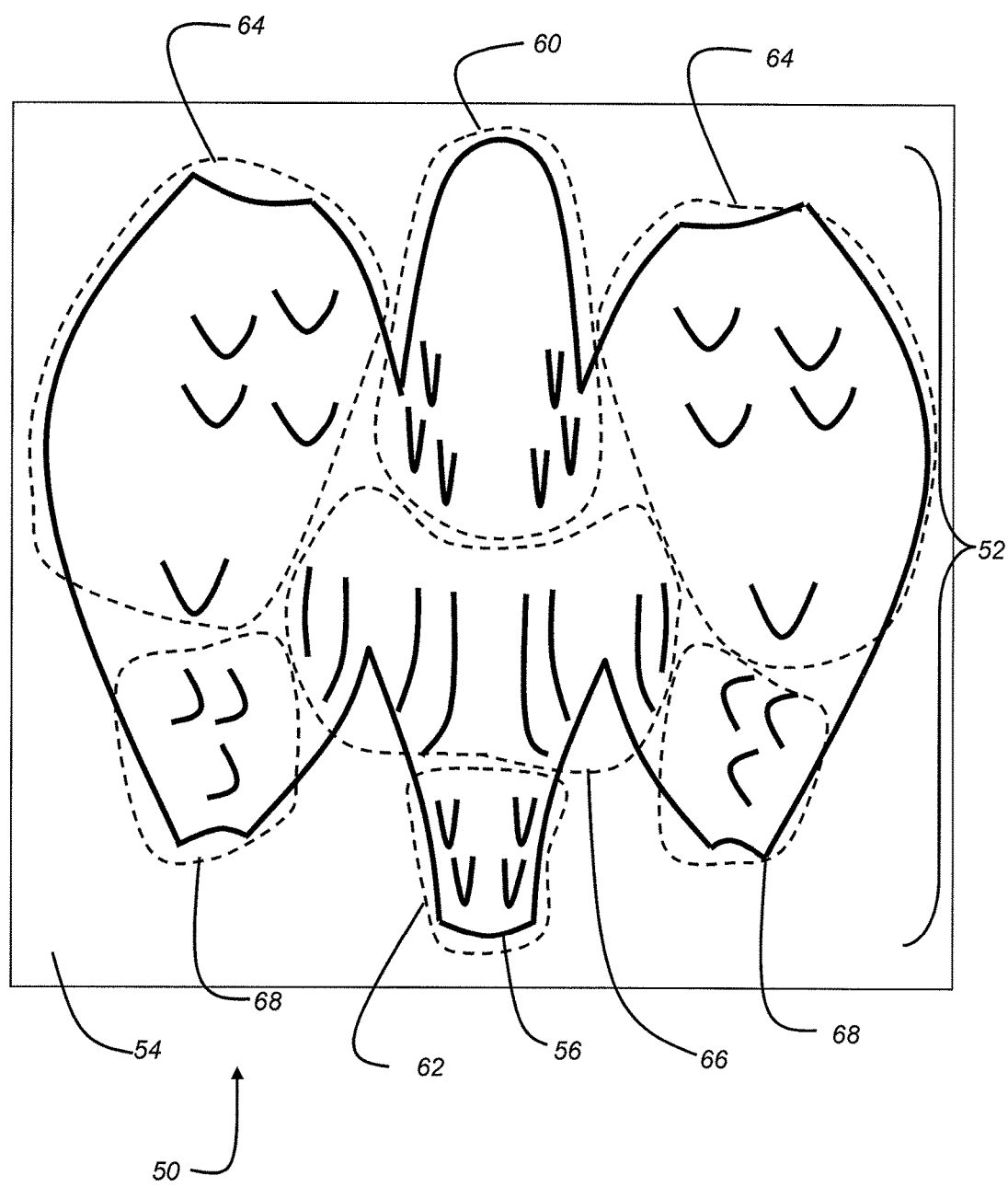
FIG. 3 illustrates a top view of a cutting die with delineated regions, according to an embodiment.
Figure 4:
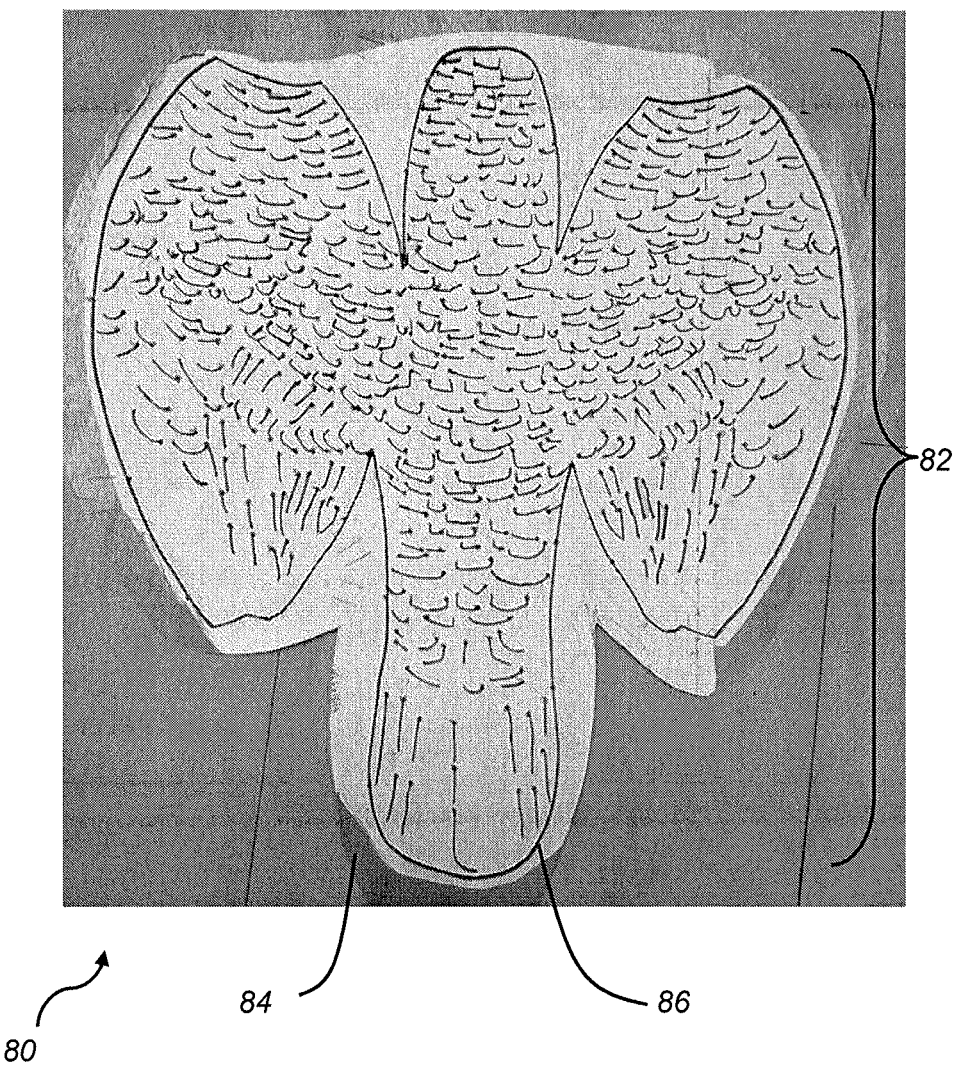
FIG. 4 illustrates a top view of a cutting die, according to an embodiment.
Figure 5:
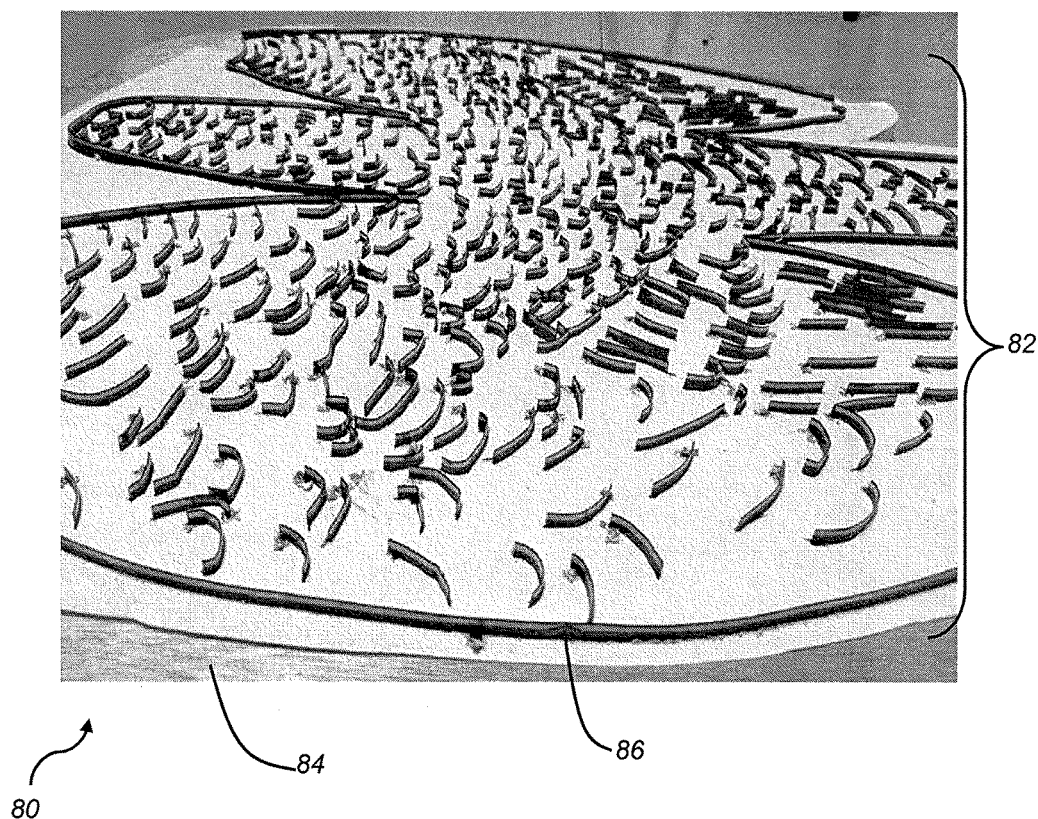
FIG. 5 illustrates an elevated side view of a cutting die, according to an embodiment.

One method of creating the feather cuts on the two-dimensional fabric includes the use of a cutting die, as shown in FIGS. 3-5. In FIG. 3 the cutting die 50 has blades 52 that are mounted to a supportive substrate 54. The blades 52 are shaped to match up with the front, back, top, or bottom edges or sides of certain feathers of the picture that is printed on the two dimensional fabric. The blades 52 also include a long continuous blade 56 that cuts the two dimensional fabric to the desired shape. The cutting die 50 is pressed into the two dimensional fabric before the fabric is formed into the three dimensional body of the decoy.

FIG. 3 shows the blades 52 that correspond with the different regions of the bird decoy 10, such as a head region 60, a tail region 62, a chest region 64, a wing region 66, and a lower body region 68. These regions are delineated with dashed lines. As described above in relation to the bird decoy 10, each region may have different types of cuts to mimic the types of feathers present in those regions. Accordingly, the cutting die 50 has different shapes of blades for each region. For example, in the wing region 66 the blades may be shaped such that the resulting feather cuts extend lengthwise along the bird body 12. In the tail region 62 and the lower body region 68 the blades may be shaped such that the resulting feather cuts mimic the shape and orientation of the printed image of the feathers. More or less blades 52 can be used in the cutting die 50 depending on the number of feather cuts desired. The cutting die 50 may also not be perfectly symmetrical as the size and position of each the blades 52 is determined based on the printed image that is used on the two-dimensional fabric.

Figure 6:
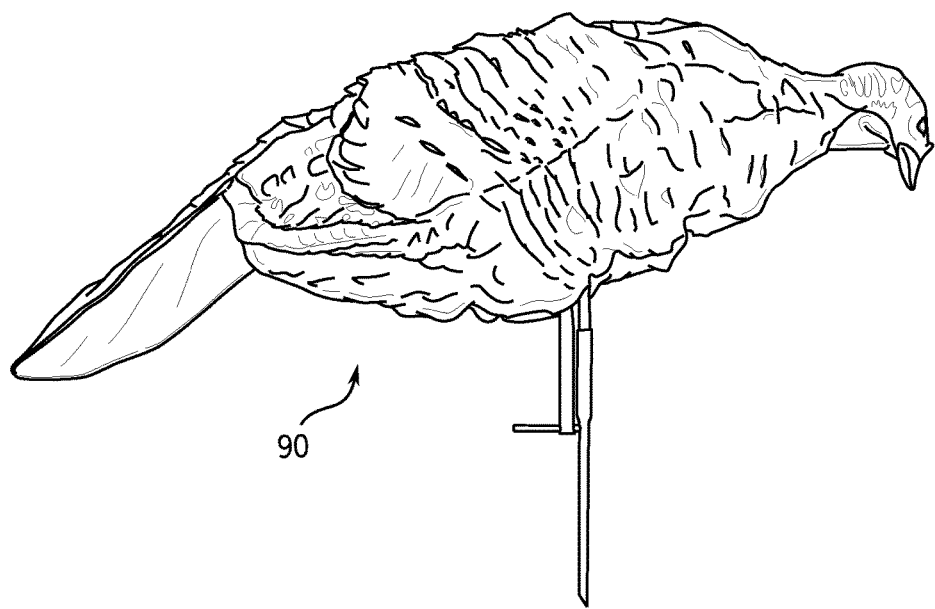
FIG. 6 illustrates a side view of an animal decoy, according to an embodiment.

FIG. 4 shows a cutting die 80 for another embodiment, and specifically for a different type of bird, such as a wild turkey. Accordingly, the regions may differ somewhat according to the type of bird. The cutting die 80 has blades 82 that are mounted to a supportive substrate 84 and also has a long continuous blade 86 that cuts the two dimensional fabric to the desired shape. FIG. 4 also shows the variation in number of blades 82 that may be used in a cutting die when compared to the cutting die 50 as shown in FIG. 3. FIG. 5 shows an elevated side view of the cutting die 80 which shows the three dimensional aspects of the blades 82. FIG. 6 shows a side view of a decoy 90 with the corresponding feather cuts produced with the cutting die 80, as shown in FIG. 5.

Another possible method of creating the feather cuts on the two-dimensional fabric includes the use of laser cutting techniques. Laser cuts would be made based on an electronic file that maps out the sequence of cuts to be made on the fabric and communicates that information to the device designed to perform the laser cutting. For example, the laser cutting device may be programmed with a Computer Aided Design (CAD) file that sets the corresponding cuts appropriately to match with the different regions of the bird decoy 10, similar to the regions as illustrated in FIG. 3 in relation to the cutting die 50.

Figure 7:
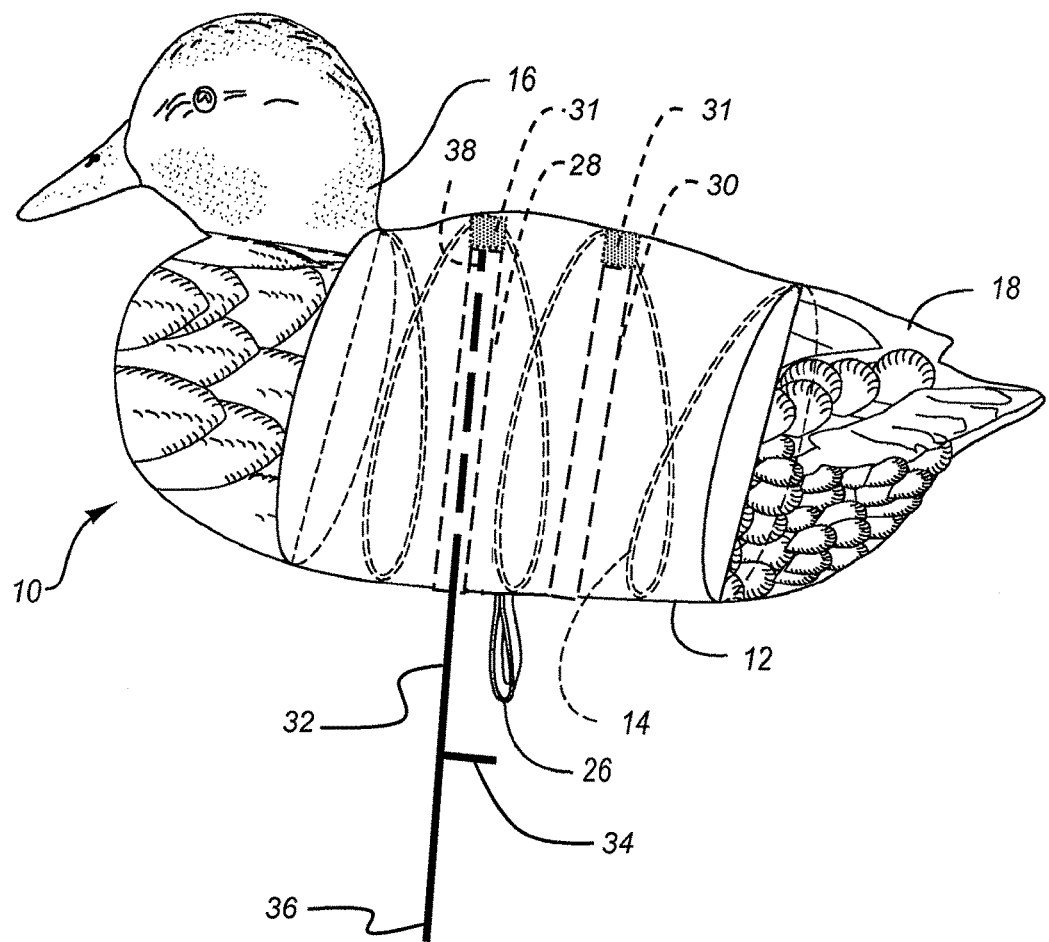
FIG. 7 illustrates a side/internal view of an animal decoy, according to an embodiment.

FIG. 7 is a side view showing the internal structure of the bird decoy 10. The decoy may include a leg pole 32 to be used for positioning and setting up the decoy. The leg pole 32 may have a pointed bottom end 36 to facilitate staking the leg pole 32 into the ground. The leg pole 32 may have a blunt top end 38 that can be inserted into the decoy and inside the leg pole sleeves 28, 30, which may be located inside the decoy. A perpendicular side piece 34 may be attached to the leg pole 32. The perpendicular side piece 34 may be used to push the pointed bottom end 36 of the leg pole 32 into the ground. Additionally, when the blunt top end 38 of the leg pole 32 is in place inside one of the leg pole sleeves 28, 30 the elastic strap 26 can be attached to the perpendicular side piece 34 in order to secure the decoy to the leg pole 32.

The leg pole sleeves 28, 30 may be sewn into the internal cavity of the bird decoy 10. The leg pole sleeves 28, 30 may also be attached at an internal point on the back of the bird decoy 10, such that the leg pole sleeves are prevented from moving within the generally hollow interior of the bird decoy 10. Each leg pole sleeve 28, 30 has an opening located on the bottom side of the bird decoy 10. The leg pole sleeves 28, 30 may extend to the inside top part of the bird decoy 10. The top of the leg pole sleeves 28, 30 may include a heavy strip of strap material 31 which helps to buffer the blunt top end 38 of the leg pole 32 from pushing up and showing on the outside back of the bird decoy 10. The leg pole sleeves 28, 30 may also be sewn such that the leg pole 32 will stop one inch from the end of the sleeve which also helps prevent the leg pole 32 from poking up through the back of the bird decoy 10.

Figure 8:
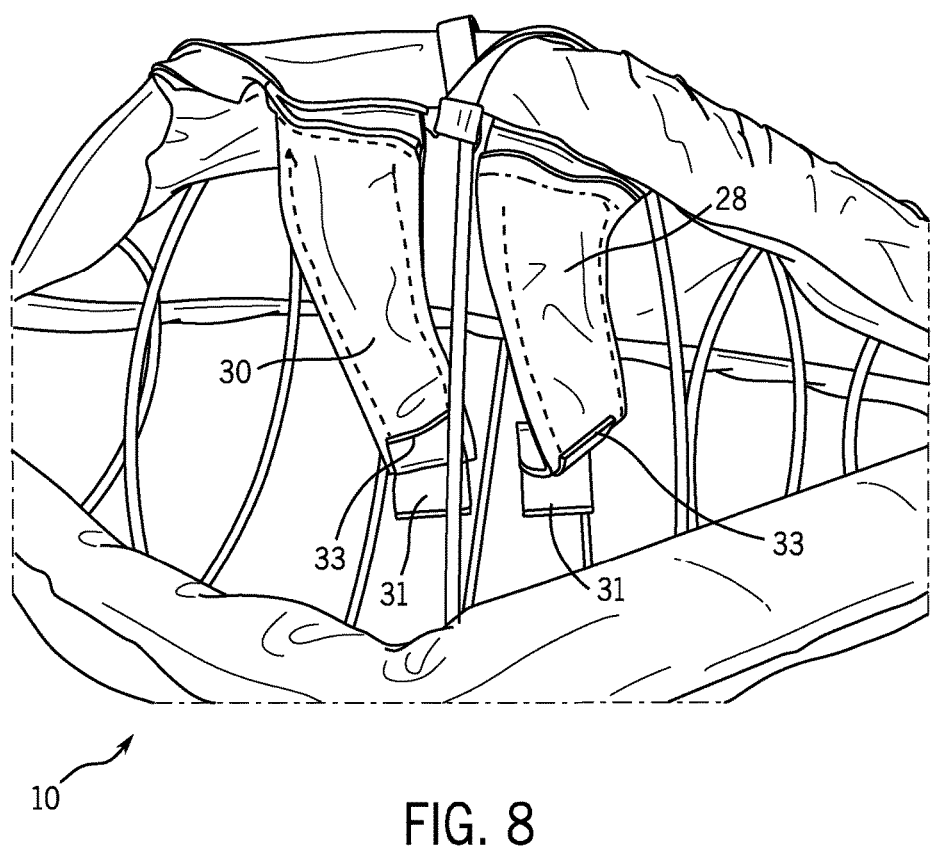
FIG. 8 illustrates an internal view of an animal decoy from the perspective of looking at the bottom of the decoy, according to an embodiment.

FIG. 8 shows an internal view of the bird decoy 10 from the perspective of looking at the bottom side of the bird decoy 10. As described above, the leg pole sleeves 28, 30 may have an optional stop 33 sewn into the leg pole sleeves 28, 30 in order to stop the top end 38 of the leg pole 32 from poking the inside back of the bird decoy 10, which would in turn show on the exterior side of bird decoy 10.

Figure 9:
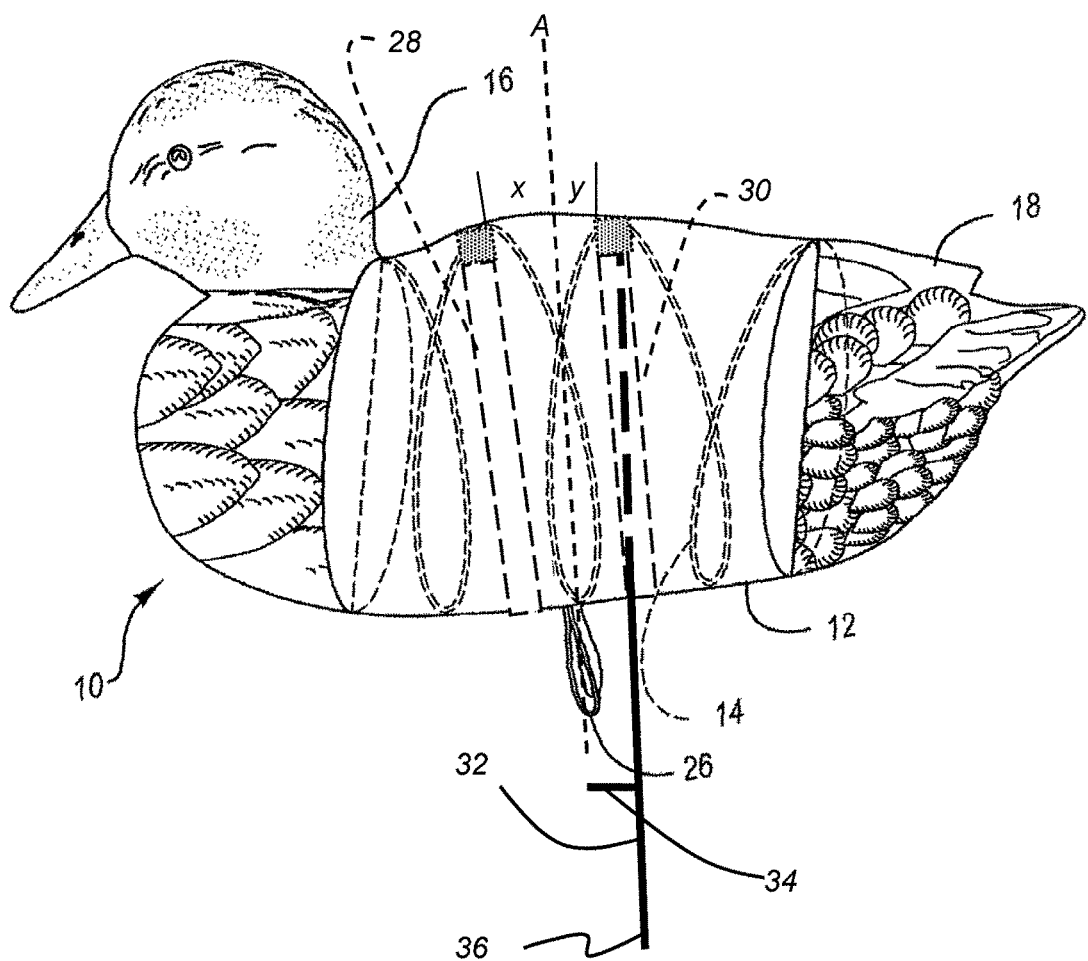
FIG. 9 illustrates a side/internal view of an animal decoy, according to an embodiment.

The different leg pole sleeves 28, 30 may provide different positions for the decoy when the leg pole 32 is utilized with the different leg pole sleeves. For example, as shown in FIG. 7, when the leg pole 32 is inserted into the front leg pole sleeve 28 the bird decoy 10 is positioned in an upright position. When the leg pole 32 is inserted into the back leg pole sleeve 30 the bird decoy 10 is positioned in a feeding position with the head region 16 pointed towards the ground, as shown in FIG. 9.

These different positions are attained through the specific positioning of the leg pole sleeves 28, 30. FIG. 9 shows that the front leg pole sleeve 28 is positioned at a first angle x compared to the center line A, and the angle between the back leg pole sleeve 30 and the center line A is at a second angle y. The first and second angles x, y may change depending on the type of bird and that particular bird's body position for feeding and standing upright Thus, the leg pole sleeves 28, 30 may be fastened into the inside of the bird decoy 10 with more or less of an angle depending on the desired pose of the bird decoy 10.

Although the variable position has been described in a three-dimensional bird decoy embodiment, it should be realized that the described technology may be used with any type of animal decoy including two-dimensional animal decoys. Additionally, the invention is not limited to two leg pole sleeves, but may include three or more leg pole sleeves depending on the desired number of poses for the specific decoy.

One skilled in the art will realize that a virtually unlimited number of variations to the above descriptions are possible, and that the examples and the accompanying figures are merely to illustrate one or more examples of implementations.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

It will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular embodiments or implementations disclosed, but that such claimed subject matter may also include all embodiments or implementations falling within the scope of the appended claims, and equivalents thereof.

In the detailed description above, numerous specific details are set forth to provide a thorough understanding of claimed subject matter. However, it will be understood by those skilled in the art that claimed subject matter may be practiced without these specific details. In other instances, methods, apparatuses, or systems that would be known by one of ordinary skill have not been described in detail so as not to obscure claimed subject matter.

Reference throughout this specification to "one embodiment," "an embodiment," "one implementation," or "an implementation" may mean that a particular feature, structure, or characteristic described in connection with a particular embodiment or implementation may be included in at least one embodiment or implementation of claimed subject matter. Thus, appearances of the phrase "in one embodiment," "an embodiment," "one implementation," or "an implementation" in various places throughout this specification are not necessarily intended to refer to the same embodiment or implementation, or to any one particular embodiment or implementation described. Furthermore, it is to be understood that particular features, structures, or characteristics described may be combined in various ways in one or more embodiments or implementations. In general, of course, these and other issues may vary with the particular context of usage. Therefore, the particular context of the description or the usage of these terms may provide helpful guidance regarding inferences to be drawn for that context.

What is claimed is:

1. A bird decoy comprising:
   a coil spring, wherein the coil spring is shaped to resemble at least a portion of a body of a bird;
   an exterior fabric layer over at least a portion of the coil spring, the exterior fabric layer displaying a realistic representation of a bird, including a representation of a first type of feather with a first edge, and a representation of a second type of feather with a second edge, wherein the exterior fabric layer is cut along at least a portion of the first edge and at least a portion of the second edge, and wherein the first type of feather is a flight feather having a length and the cut along at least a portion of the first edge is along the length and the second type of feather is a contour feather and the cut along at least a portion of the second edge is a C-shaped cut around a trailing edge of the contour feather.

2. The bird decoy of claim 1, further comprising:
   a second fabric layer, wherein the second fabric layer is positioned underneath the exterior fabric layer and it displays the same realistic representation of a bird as the exterior fabric layer.

3. The bird decoy of claim 1, wherein the exterior fabric layer is a two-dimensional realistic representation of a bird.

4. The bird decoy of claim 1, wherein the bird decoy is a three-dimensional realistic representation of a bird.

5. The bird decoy of claim 4, wherein the bird decoy is compressible.

6. The bird decoy of claim 1, further comprising:
- a first leg pole sleeve including a first top section attached at a first point within an internal cavity of the bird decoy and a first opening connected to the exterior fabric layer, the first leg pole sleeve being positioned within the bird decoy at a first angle with respect to a center line of the bird decoy; and
- a second leg pole sleeve including a second top section attached at a second point within the internal cavity of the bird decoy and a second opening connected to the exterior fabric layer, the second leg pole sleeve being positioned at a second angle with respect to the center line.

7. A bird decoy comprising:
- a coil spring, wherein the coil spring is shaped to resemble at least a portion of a body of a bird;
- an exterior fabric layer over at least a portion of the coil spring, the exterior fabric layer displaying a realistic representation of a bird, including a representation of a first type of feather with a first edge, and a representation of a second type of feather with a second edge, wherein the exterior fabric layer is cut along at least a portion of the first edge and at least a portion of the second edge, and
- a second fabric layer, wherein the second fabric layer is positioned underneath the exterior fabric layer and it displays the same realistic representation of a bird as the exterior fabric layer.

8. The bird decoy of claim 7, wherein the exterior fabric layer is a two-dimensional realistic representation of a bird.

9. The bird decoy of claim 7, wherein the bird decoy is a three-dimensional realistic representation of a bird.

10. The bird decoy of claim 9, wherein the bird decoy is compressible.

11. The bird decoy of claim 7, further comprising:
- a first leg pole sleeve including a first top section attached at a first point within an internal cavity of the bird decoy and a first opening connected to the exterior fabric layer, the first leg pole sleeve being positioned within the bird decoy at a first angle with respect to a center line of the bird decoy; and
- a second leg pole sleeve including a second top section attached at a second point within the internal cavity of the bird decoy and a second opening connected to the exterior fabric layer, the second leg pole sleeve being positioned at a second angle with respect to the center line.

* * * * *